No. 757,232. PATENTED APR. 12, 1904
P. V. SCHANDONEY.
DRAFT EQUALIZER.
APPLICATION FILED DEC. 12, 1903.
NO MODEL. 2 SHEETS—SHEET 1.
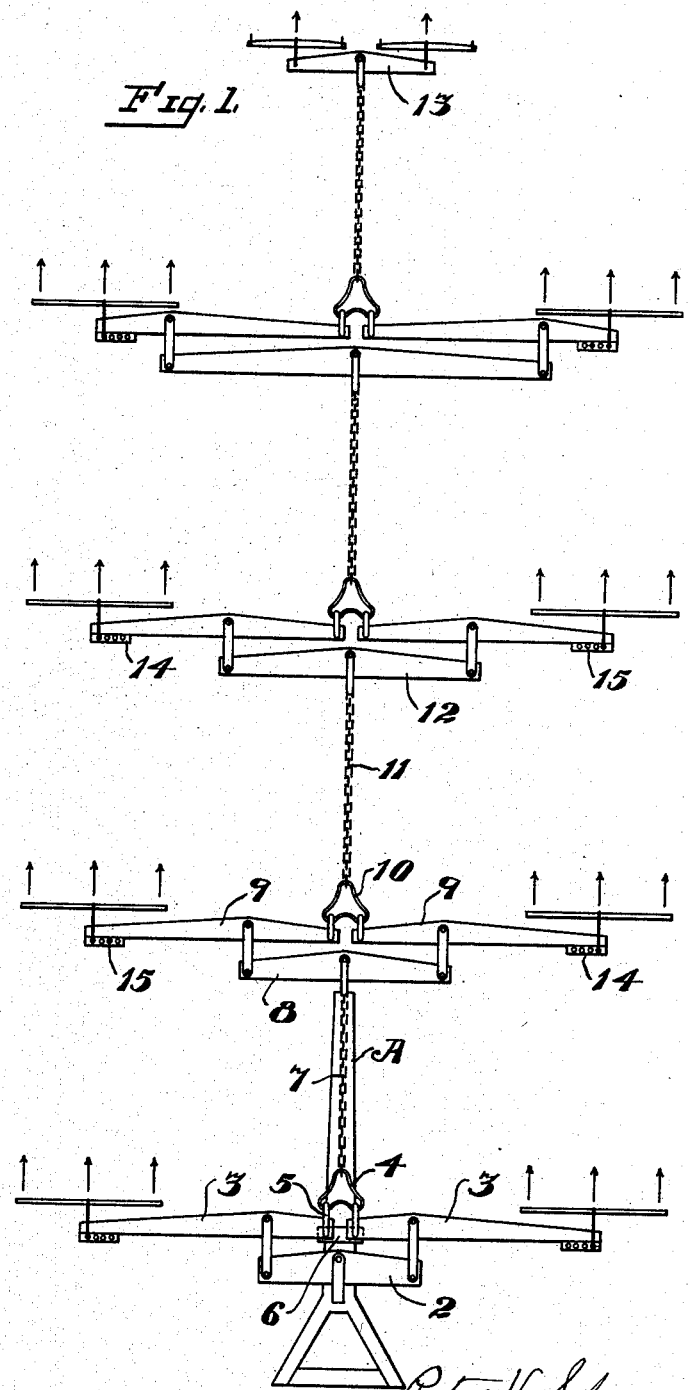

No. 757,232. PATENTED APR. 12, 1904.
P. V. SCHANDONEY.
DRAFT EQUALIZER.
APPLICATION FILED DEC. 12, 1903.
NO MODEL. 2 SHEETS—SHEET 2.
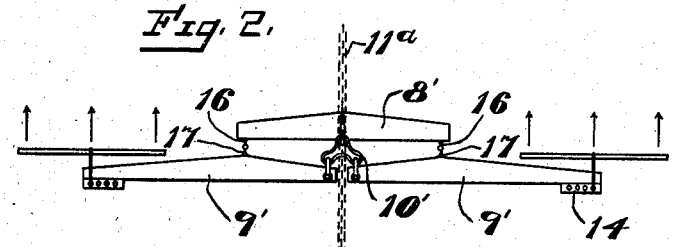
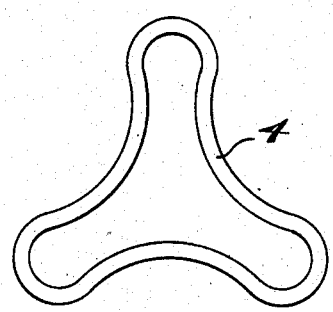
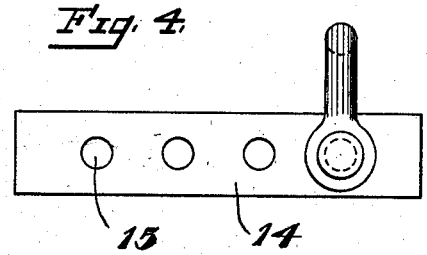
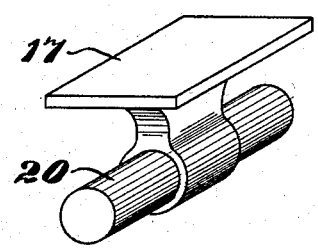
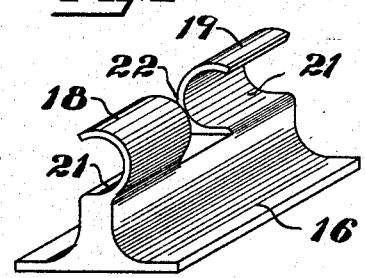
Witnesses,
Inventor,
Peter V. Schandoney
By Geo. H. Strong
Atty.

No. 757,232.

Patented April 12, 1904.

UNITED STATES PATENT OFFICE.

PETER V. SCHANDONEY, OF SACRAMENTO, CALIFORNIA.

DRAFT-EQUALIZER.

SPECIFICATION forming part of Letters Patent No. 757,232, dated April 12, 1904.

Application filed December 12, 1903. Serial No. 184,924. (No model.)

*To all whom it may concern:*

Be it known that I, PETER V. SCHANDONEY, a citizen of the United States, residing at Sacramento, in the county of Sacramento and State of California, have invented new and useful Improvements in Draft-Equalizers, of which the following is a specification.

My invention relates to an improved means for equalizing the draft of large teams used in hauling combined harvesters, gang-plows, or other heavy machinery.

It is usual to employ teams of from twenty-four to thirty-six horses in hauling a modern combined harvesting-machine, and various expedients have been devised and tried for hitching up the several animals so that the strain and pull may be proportioned among them according to the strength of each. A series of cross-bars, whiffletrees, and swingletrees with connecting cords or chains are generally used, with the animals arranged three or six abreast. The tendency in many of the systems is for the animals to become entangled in the draft-chains, particularly where the latter are disposed with parallel sections, and for the inner ends of the crosstrees or the ends where the draft is heaviest to sag and strike the ground, upsetting the balance of draft and interfering with the movement of the team.

The object of my invention is to devise means for connecting up the several elements of the equalizer so that each animal may be made to pull his own load and no more, to provide means for shortening the length of the team for rendering the guiding of these large teams easier, to simplify the connections between successive series of animals, and to maintain all the trees in substantially horizontal position, and thus balance the draft.

It consists of the parts and the construction and combination of parts hereinafter more fully described, having reference to the accompanying drawings, in which—

Figure 1 is a plan view of my invention. Fig. 2 is a modification of same. Fig. 3 is an enlarged detail of yoke. Fig. 4 is an enlarged detail of adjusting-plate. Fig. 5 is a perspective of female member of hinge. Fig. 6 is a perspective of male member of hinge.

A represents the pole of the vehicle, to which is pivoted the usual doubletree 2. Suitably swiveled to the ends of this doubletree or draft-bar are the equalizers 3.

In the present instance I have shown the team composed of twenty-six animals arranged in successive series of three on each side of a center line, the entire series being preceded by two leaders, by which the movements of the whole team are directed. Usually the animals are placed six abreast throughout the team, and it is a matter of considerable skill, accompanied by much difficulty, to guide such a team. By arranging the team in the manner shown, with only two leaders to look after, the driving becomes greatly simplified. The use thus of only two leaders is rendered possible and practicable by the present system. Inasmuch as the three animals attached to each of the equalizers 3 have to pull against all that portion of the team in front the connection of an equalizer 3 with the doubletree or draft-bar 2 will be at such a point intermediate of the ends of the equalizer as to bring about an equable pull on each end thereof. The adjacent ends of the equalizers 3 are flexibly connected by a triangular yoke 4, having concaved sides (shown in detail in Fig. 3) and the clevises 5, while to the under side of the clevises is pivotally attached a link or plate 6, resting and sliding on the pole and supporting the ends of the equalizers. This yoke and slide-plate is the first point of novelty in my invention. From yoke 4 a chain 7 extends along the pole to a doubletree or draft-bar 8, to the ends of which bar equalizers 9 are attached and connected by yoke 10 similarly as with equalizers 3, except that the slide-plate 6 is omitted as being unnecessary. From yoke 10 a second section of chain 11 extends to a third doubletree or draft-bar 12 in advance, and so on through the team, the fulcrum-points of the several equalizers varying according as the power in front diminishes relative to the draft on the outer ends of the equalizers until we have the two leaders at 13 pulling against the six immediately behind. Throughout the system, however, the adjacent ends of the equalizers are flexibly connected by a yoke, as described, and only a single section of chain is used between one set of equalizers and the draft-bar in advance. The result of flexibly coupling the inner ends of the equalizers by comparatively short connections, as the yokes and clevises, is that the equalizers are maintained substantially horizontal and kept from sagging and from striking the animals' heels, and yet sufficient back and forward play is allowed for the proper action of the team. The three parts of the yoke being symmetrical it is self-adjusting the moment pull is exerted on its three corners. The single draft-chain connection between the several series of animals is less likely to become entangled with the legs of the animals than where the connecting-chains are in two parallel sections. The single-chain connection and the yoke-coupling have been found to work to far greater practical advantage than where systems of double chains with adjustable connections between the several cross-trees and equalizers are used. The advantage is attributable to the maintenance of a more equable leverage on the various fulcrum parts, so that the animals on one side of the team do not have to pull an undue proportion of the load, and to the preservation of the alinement of the equalizers in the several pairs, so that the sag hereinbefore mentioned is obviated. As a further means of equalizing the haul on the several animals I provide means by which any set of three animals on the end of an equalizer-bar may be shifted toward or from the fulcrum and made to pull more or less, according to their capabilities. As shown in Fig. 4, a plate 14, having a series of transverse perforations 15, may be secured to the back and near the outer end of each equalizer, and the clevis-bolt of the crosstree to which the animals are hitched is slipped through one or the other of these perforations, according as the load for these particular animals is to be greater or less. This adjustment 14 would be used more particularly on the rearmost equalizers, since the weaker animals are usually placed in the wheel. By shifting the attachment of the crosstree toward the outer end of plate 14 a portion of the burden is thrown upon the part of the team in advance.

In Fig. 2 is shown a modification of my equalizing means in which the same principle of draft-chain connection and yoke-coupling is used, but in which the arrangement of doubletrees or draft-bars and equalizers is reversed to permit the shortening up of the team by allowing the horses in rear to walk closer to those in advance. Accordingly each pair of equalizing-bars, as 9', is hinged rearward of its respective doubletree or draft-bar, as 8'. The adjacent ends of the bars 9' are coupled together by means of the yoke 10', and a chain 11ª extends from yoke 10' beneath tree 8' to the tree in advance, which latter has its equalizing-bars hinged behind it in the same manner. The series of animals for each pair of equalizers 9', &c., are hitched thereto as in the first instance.

The hinges of the equalizers and draft-bars are of peculiar construction, so that the parts may not only be quickly assembled, but cannot be accidentally disconnected, and the equalizers are prevented from falling down under the draft-bars when strain is put upon the parts. The result is by putting the draft-bar in advance of the equalizers the attachment of the animals to the latter is not interfered with, while the rear horses are enabled to walk that much closer to the equalizers in front.

The hinges for the equalizers and draft-bars comprise a member 16, adapted to be secured to one or the other of the connected parts, and an interlocking member 17, secured to the other part. The member 16 is formed of two separated coaxial reversely-curved segments 18 19, adapted partially to embrace the pin portion 20 of member 17. The segments 18 19 are formed with seat portions 21, against which the pin 20 bears. The members 16 17 are locked or unlocked by turning the pin to one side to disengage the segments and removing it through the slot 22 between the segments. When in position, the pin 20 stands vertical, and since the equalizers are maintained practically horizontal by reason of the coupling-yoke and the support afforded by the chain, which reaches from the equalizers in rear, any danger of the hinge members becoming separated unintentionally is avoided. The only way the hinge can be parted is by disconnecting the adjacent ends of the equalizers and allowing those ends to drop down. This form of hinge avoids all loose pins, nuts, bolts, and the like, which are so easily lost in the harvest-field.

Having thus described my invention, what I claim, and desire to secure by Letters Patent, is—

1. In draft-equalizing means, the combination of the pole of the vehicle, a draft-bar pivoted thereon, equalizing-bars pivoted to said draft-bar, a flexible coupling between the adjacent ends of said equalizing-bars, a plate sustained by said coupling and supported on the pole, and flexible connections between said coupling and draft-bars in front.

2. In draft-equalizing means, the combination of a series of successively-arranged draft-bars, a pair of equalizing-bars pivoted to each draft-bar, pivoted connections between the adjacent ends of the equalizing-bars and including a yoke with substantially a triangular opening having three symmetrical points of attachment and flexible connections between said yoke and the draft-bar next in series.

3. In draft-equalizing means the combination with a series of successively-arranged draft-bars, of a pair of equalizers hinged rearward of said draft-bars, a coupling between the adjacent ends of said equalizers permitting of a limited horizontal oscillating movement, and a chain connecting said couplings with the draft-bar next in series.

4. In draft-equalizing means the combination with a draft-bar, an equalizer hinged thereto, said hinge comprising a member having bifurcated, segmental oppositely-curved embraces and the other member having axially-alined pin members to engage said embraces.

5. In draft-equalizing means, the combination of a series of successively-arranged draft-bars, the rearmost one of which is fulcrumed to the pole of the vehicle, equalizing-bars connected with the ends of the draft-bars, and connections including yokes with symmetrical and separated points of attachment between the adjacent ends of the equalizing-bars and the draft-bars next in series, and transversely-perforated plates on the back and near the outer ends of the equalizing-bars to permit a clevis to be engaged more or less remote from the fulcrum of the respective equalizing-bar.

6. A draft-equalizing system comprising a series of successively-arranged draft-bars, equalizing-bars fulcrumed to the draft-bars, flexible connections between a draft-bar and an equalizing-bar next in rear thereof and including a yoke with substantially a triangular opening having three symmetrical points of attachment, means at the outer ends of the equalizing-bars for placing a plurality of animals abreast, and means connected to the foremost draft-bar for the attachment of two leading animals.

In testimony whereof I have hereunto set my hand in presence of two subscribing witnesses.

PETER V. SCHANDONEY.

Witnesses:
JOE LAWRENCE,
F. L. HAM.